(12) United States Patent
Klimczak et al.

(10) Patent No.: US 12,459,199 B2
(45) Date of Patent: Nov. 4, 2025

(54) APPARATUS, SYSTEM AND METHOD OF PROVIDING DYNAMIC HOB PINCH FORCE IN AN ADDITIVE MANUFACTURING PRINT HEAD

(71) Applicant: JABIL INC., St. Petersburg, FL (US)

(72) Inventors: Scott Klimczak, St. Petersburg, FL (US); Luke Rodgers, St. Petersburg, FL (US); Darin Burgess, St. Petersburg, FL (US)

(73) Assignee: JABIL INC.

( * ) Notice: Subject to any disclaimer, the term of this patent is extended or adjusted under 35 U.S.C. 154(b) by 0 days.

(21) Appl. No.: 18/637,622

(22) Filed: Apr. 17, 2024

(65) Prior Publication Data

US 2024/0269924 A1 Aug. 15, 2024

Related U.S. Application Data

(63) Continuation of application No. 17/391,740, filed on Aug. 2, 2021, now Pat. No. 11,987,000, which is a continuation of application No. 17/417,048, filed as application No. PCT/US2019/066846 on Dec. 17, 2019, now Pat. No. 11,945,162.

(60) Provisional application No. 62/782,574, filed on Dec. 20, 2018.

(51) Int. Cl.
| | |
|---|---|
| *B29C 64/209* | (2017.01) |
| *B29C 64/321* | (2017.01) |
| *B29C 64/393* | (2017.01) |
| *B33Y 10/00* | (2015.01) |
| *B33Y 30/00* | (2015.01) |
| *B33Y 50/02* | (2015.01) |
| *B29C 64/118* | (2017.01) |

(52) U.S. Cl.
CPC .......... *B29C 64/209* (2017.08); *B29C 64/321* (2017.08); *B29C 64/393* (2017.08); *B33Y 10/00* (2014.12); *B33Y 30/00* (2014.12); *B33Y 50/02* (2014.12); *B29C 64/118* (2017.08)

(58) Field of Classification Search
CPC ..................................... B29C 64/118
See application file for complete search history.

(56) References Cited

U.S. PATENT DOCUMENTS

| | | | | |
|---|---|---|---|---|
| 2007/0003656 | A1* | 1/2007 | LaBossiere | ........... B29C 64/118 |
| | | | | 425/375 |
| 2015/0093465 | A1* | 4/2015 | Page | ...................... B29C 64/118 |
| | | | | 425/132 |
| 2017/0232674 | A1* | 8/2017 | Mark | .................... B29C 64/118 |
| | | | | 264/308 |

* cited by examiner

*Primary Examiner* — Timothy Kennedy
(74) *Attorney, Agent, or Firm* — Riverside Law LLP

(57) ABSTRACT

The disclosure is of and includes at least an apparatus, system and method for a print head for additive manufacturing. The apparatus, system and method may include at least two proximate hobs suitable to receive and extrude therebetween a print material filament for the additive manufacturing; a motor capable of imparting a rotation to at least one of the two hobs, wherein the extrusion results from the rotation; a dynamic force adjustment capable of exerting force on one of the two hobs to urge the force-receiving hob toward the other of the two hobs; and a controller communicatively connected with the dynamic force adjustment and capable of controlling the force exertion thereof.

8 Claims, 9 Drawing Sheets

APPARATUS, SYSTEM AND METHOD OF PROVIDING DYNAMIC HOB PINCH FORCE IN AN ADDITIVE MANUFACTURING PRINT HEAD

CROSS-REFERENCE TO RELATED APPLICATIONS

The present application claims benefit of priority to U.S. application Ser. No. 17/391,740, filed Aug. 2, 2021, entitled "Apparatus, System and Method of Providing Dynamic Hob Pinch Force in an Additive Manufacturing Print Head," which claims priority to U.S. application Ser. No. 17/417,048, filed Jun. 21, 2021, entitled: "Apparatus, System and Method of Providing Dynamic HOB Pinch Force in an Additive Manufacturing Print Head," which claims priority to International Application No. PCT/US2019/066846, filed Dec. 17, 2019, entitled: "Apparatus, System and Method of Providing Dynamic HOB Pinch Force in an Additive Manufacturing Print Head," which claims priority to U.S. Provisional Application No. 62/782,574, filed Dec. 20, 2018, entitled: "Apparatus, System and Method of Providing Dynamic HOB Pinch Force in an Additive Manufacturing Print Head," the entirety of which is incorporated herein by reference as if set forth in its entirety.

BACKGROUND

Field of the Disclosure

The present disclosure relates to additive manufacturing, and, more specifically, to an apparatus, system and method of providing dynamic hob pinch force in an additive manufacturing print head.

Description of the Background

Additive manufacturing, including three dimensional printing, has constituted a very significant advance in the development of not only printing technologies, but also of product research and development capabilities, prototyping capabilities, and experimental capabilities, by way of example. Of available additive manufacturing (collectively "3D printing") technologies, fused deposition of material ("FDM") printing is one of the most significant types of 3D printing that has been developed.

FDM is an additive manufacturing technology that allows for the creation of 3D elements on a layer-by-layer basis, starting with the base, or bottom, layer of a printed element and printing to the top, or last, layer via the use of, for example, heating and extruding thermoplastic filaments into the successive layers. Simplistically stated, an FDM system includes a print head in which the print material filament is fed through a material guide to a heated nozzle, an X-Y planar control for moving the print head in the X-Y plane, and a print platform upon which the base is printed and which moves in the Z-axis as successive layers are printed.

More particularly, the FDM printer nozzle heats the thermoplastic print filament received from the material guide to a semi-liquid state, and deposits the semi-liquid thermoplastic in variably sized beads along the X-Y planar extrusion path dictated by the print plan provided for the building of each successive layer of the element. The printed bead/trace size may vary based on the part, or aspect of the part, then-being printed. Further, if structural support for an aspect of a part is needed, the trace printed by the FDM printer may include removable material to act as a sort of scaffolding to support the aspect of the part for which support is needed. Accordingly, FDM may be used to build simple or complex geometries for experimental or functional parts, such as for use in prototyping, low volume production, manufacturing aids, and the like.

However, the use of FDM in broader applications, such as medium to high volume production, is severely limited due to a number of factors affecting FDM, and in particular affecting the printing speed, quality, and efficiency for the FDM process. As referenced, in FDM printing it is typical that a thermoplastic is extruded from the print head, and then heated and pushed outwardly from a heating nozzle, under the control of the print head, onto either a print plate/platform or a previous layer of the part being produced. The nozzle is moved about by the robotic X-Y planar adjustment of the print head in accordance with a pre-entered geometry, such as may be entered into a processor to control the robotic movements to form the part desired.

Thus, current limitations on the cost, efficiency, and performance of additive manufacturing often occur due to the nature of known print heads, such as those print heads typically provided in FDM printing. In short, in a typical known print head, print material is fed from a spool through two print hobs that are forced into rotational contact in order to extrude the print material toward the "hot end" of the printer. In known embodiments, a stepper motor may turn either or both adjoining hobs having the print material therebetween in order to feed the print material from the spool to the hot end. However, the current print material feeds often scores or crimps the filament, and further subjects the print material filament to various undesirable effects, such as compression, friction, and lag, often due to improperly set force applied to the hobs.

Moreover, the known art includes no mechanism for dynamically adjusting the material feed to avoid the aforementioned scoring and crimping of the feed material. More specifically, the material feed hobs are generally adjusted using a manual adjustment screw. As such, to the extent a crimp, scoring, looping, or like material feed error occurs, a user would need to manually adjust the hob force using the aforesaid manual adjustment screw in-print in order to take remedial action. And, at that, the manual adjustment would necessarily be highly likely to be insufficient or improper in order to fix the problem, due to its unrefined manual nature.

SUMMARY

The disclosure is of and includes at least an apparatus, system and method for a print head for additive manufacturing. The apparatus, system and method may include at least two proximate hobs suitable to receive and extrude therebetween a print material filament for the additive manufacturing; a motor capable of imparting a rotation to at least one of the two hobs, wherein the extrusion results from the rotation; a dynamic force adjustment capable of exerting force on one of the two hobs to urge the force-receiving hob toward the other of the two hobs; and a controller communicatively connected with the dynamic force adjustment and capable of controlling the force exertion thereof.

BRIEF DESCRIPTION OF THE DRAWINGS

The disclosed non-limiting embodiments are discussed in relation to the drawings appended hereto and forming part hereof, wherein like numerals indicate like elements, and in which.

DETAILED DESCRIPTION

Figure 1:
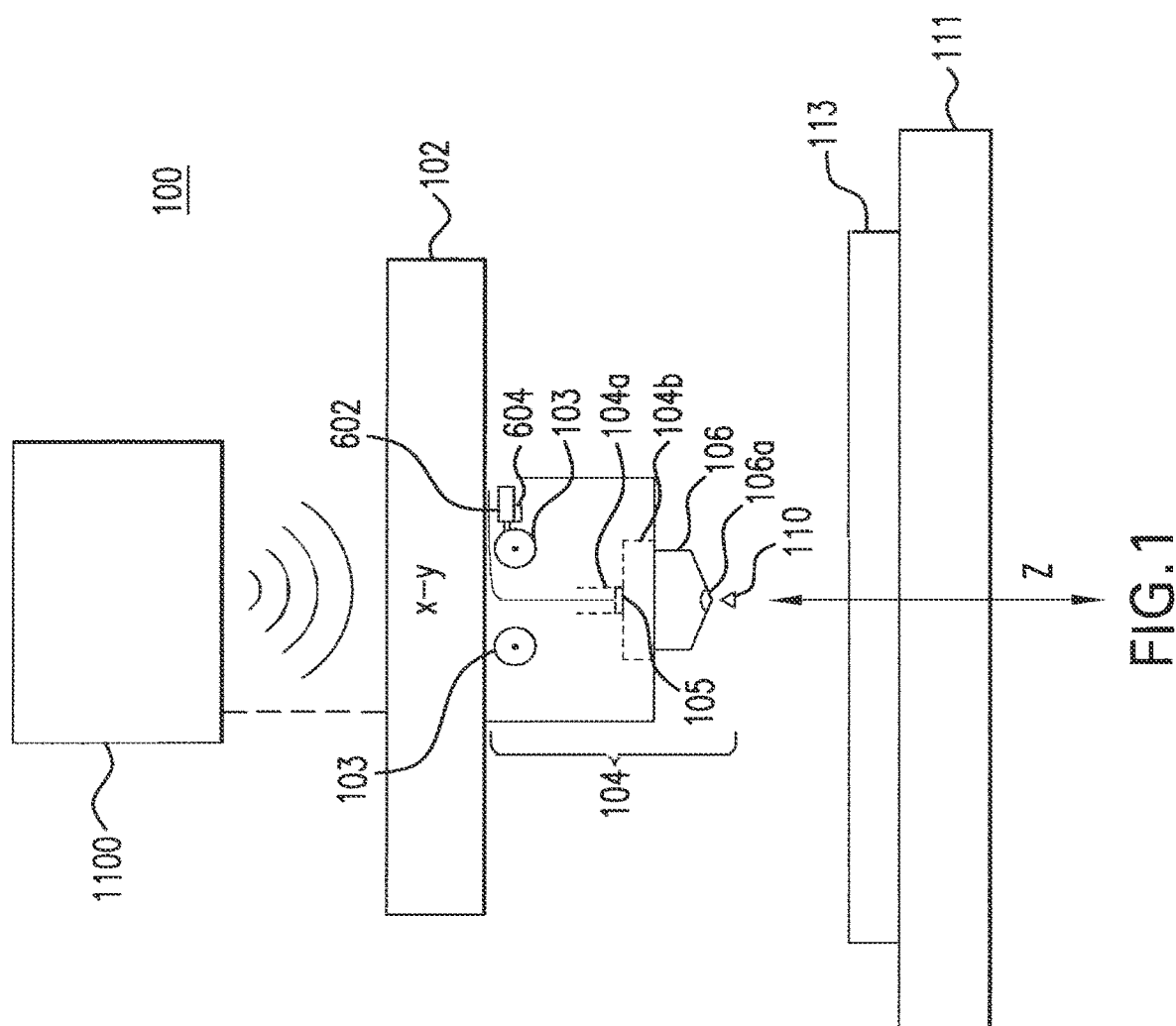
FIG. 1 is an illustration of an additive manufacturing printer.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to" or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

The embodiments are and include automated and/or real time dynamic variation in the force applied between the hobs that feed the print material filament through an additive manufacturing print head, such as a FDM print head. That is, in contrast to the known art, the embodiments may modify the inter-hob force applied to the print filament with very high specificity and repeatability, both before and during a print run. As such, the dynamic variability in hob force in-print provided in the embodiments provides significant advantages over the known art, in which hob-force is held constant for the duration of the print run.

FIG. 1 is a block diagram illustrating an exemplary FDM printer 100. In the illustration, the printer includes an X-Y axis driver 102 suitable to move the print head 104, and thus the print nozzle 106, in a two dimensional plane, i.e., along the X and Y axes. Further included in the printer 100 for additive manufacturing are the aforementioned print head 104, which includes material guide 104a, heater 104b, and print nozzle 106. As is evident from FIG. 1, printing may occur upon the flow of heated print material outwardly from the nozzle 106 along a Z axis with respect to the X-Y planar movement of the X-Y driver 102. Thereby, layers of printed material 110 may be provided from the nozzle 106 onto the build plate 111 along a path dictated by the X-Y driver 102 to form layers 113.

A servo or stepper motor 602 may be employed to drive one or both hob(s) 103, according to certain of the embodiments. A motor encoder 604 may also be provided in conjunction with the motor 602, as discussed further herein below. The use of an encoder may allow for monitoring, such as by controller 1100, for slippage, motor counterforce, or the like so that adjustments may be made to maintain a desired and consistent filament feed speed. The encoder 604, such as an integrated magnetic encoder, may thus be provided in association with the hobs 103 and/or the driver motor 602 to provide for enhanced printing resolution and control due to improved motor position assessment, as will be understood to those of ordinary skill in the pertinent arts.

More particularly, the print head 104 serves the function of extruding the print filament 110, using hobs 103 driven by motor 602, through the material guide 104a into the hot end 106 at the speed dictated by the rotation of the hobs 103. That is, filament-based printers use the foregoing hob-based feed mechanism to move the print material filament 110 through the material guide 104a and into the heated nozzle 106 with great precision, and at a controlled feed rate tied to the print plan, i.e., intimately tied to the X-Y and Z axes motion undertaken by the print driver pursuant to the print plan, as discussed above. It should be noted that it is desirable that the print head 104 be enabled to dynamically go from a significant filament feed speed to zero speed, and from zero to significant filament feed speed, readily, to optimally perform any print plan.

Figure 2:
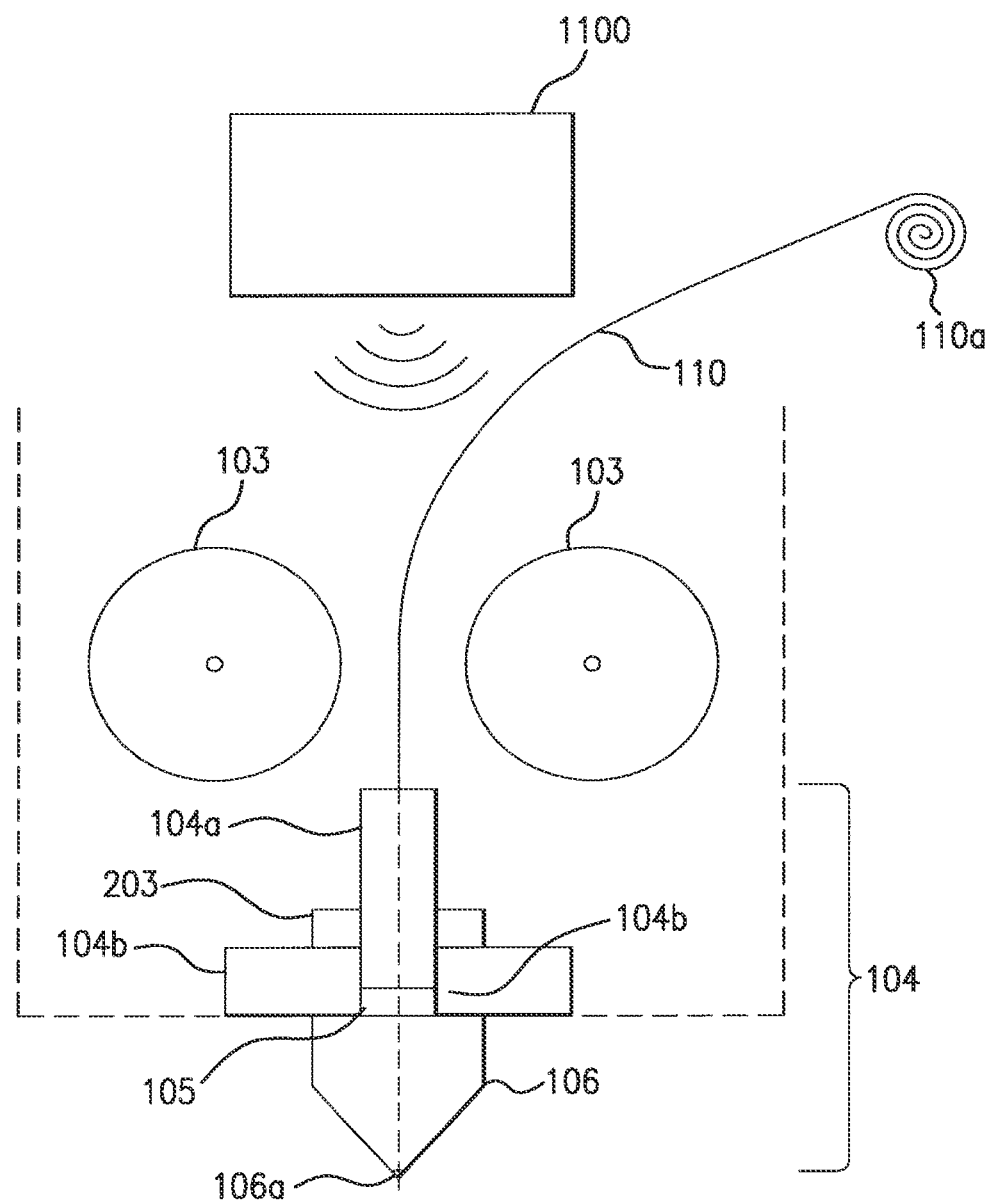
FIG. 2 is an illustration of an exemplary additive manufacturing system.

FIG. 2 illustrates with greater particularity a print head 104, material guide 104a, heater 104b and nozzle 106 system for an exemplary additive manufacturing device, such as a 3-D printer, such as a FDM printer. As illustrated, the print material 110 is extruded via hobs 103 of the head 104 from a spool of print material 110a into the material guide 104a, through which the material 110 reaches heater 104b, which heats the print material 110 to at least a semi-liquid state so that the print material 110 may be printed through the nozzle 106. That is, as the heater 104b heats the print material 110, the print material is at least partially liquefied to traverse through the nozzle 106 for output from the end port 106a of the nozzle at a point along the nozzle distal from the print head 104. Thereby, the extruded material is "printed" outwardly from the port 106a along the Z axis and along an X-Y planar path determined by the print plan 104a executed by the controller 1100 associated with the print head 104.

Specifically, the print head 104 feeds print material filament 110 into the upper portion of the material guide 104a, and the heat applied by the heater 104b to the filament 110 causes a portion of the filament 110 to melt as it passes through transition point 105. It will be appreciated that, if the speed at which the hobs 103 of the print head 104 feed the filament 110 to the heater 104b exceeds the melting capabilities of the system, the unmelted portion of the print filament 110 will penetrate through the transition point 105 and may clog the nozzle 106.

Figure 3:
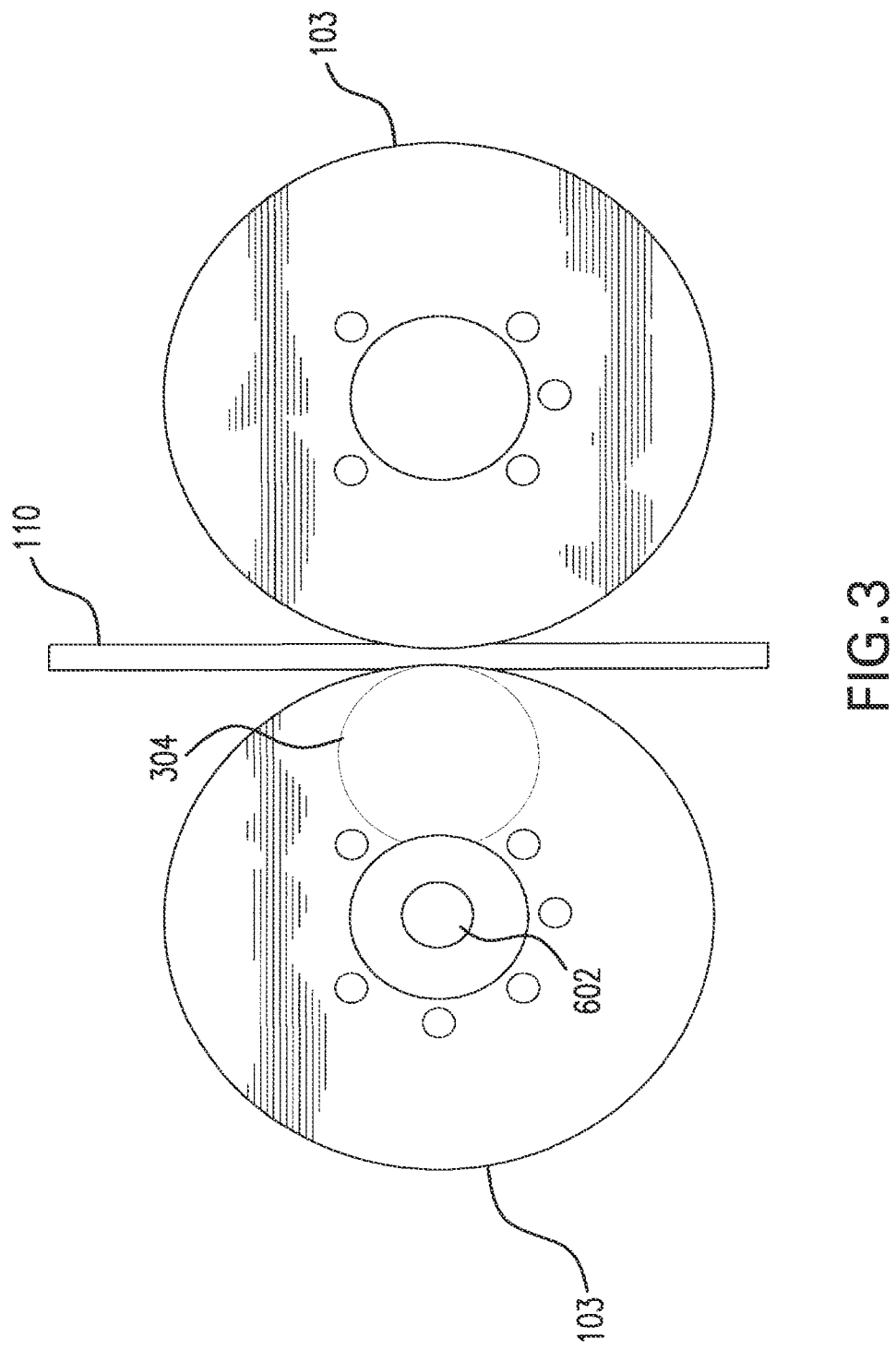
FIG. 3 illustrates aspects of an additive manufacturing print head.

FIG. 3 illustrates with specificity the engagement 304 of a hob 103 with a print material filament 110, as those terms are used herein. This engagement length 304 results from the diameter of hobs 103, and is a result of a force applied to urge the hobs together, as discussed throughout. In embodiments, an exemplary diameter for hob 103 may be, by way of example, in a range of 8 mm-40 mm.

Figure 4:
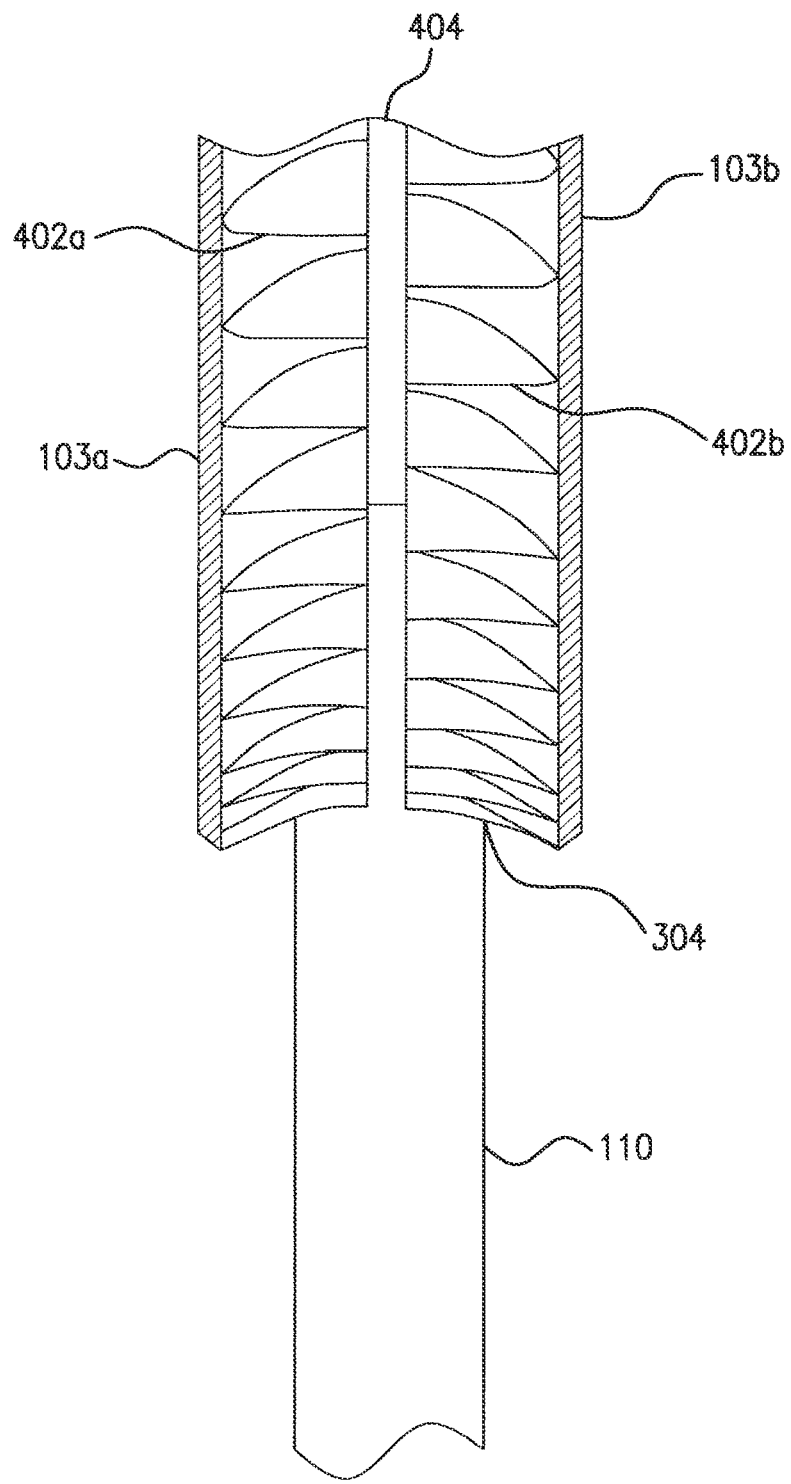
FIG. 4 illustrates aspects of an additive manufacturing print head.

Further and as illustrated in the exemplary embodiment of FIG. 4, a series of teeth 402a, 402b may be provided on each hob 103, and/or on each half hob 103a, 103b. The teeth 402 may, by way of non-limiting example, have sharpened surfaces, such as in order to enhance the grip on filament 110. Of note, the teeth 402 of the hob 103 may optionally be offset with respect to the mating set of teeth 402a, 402b on each hob half 103a, 103b.

Figure 5A:
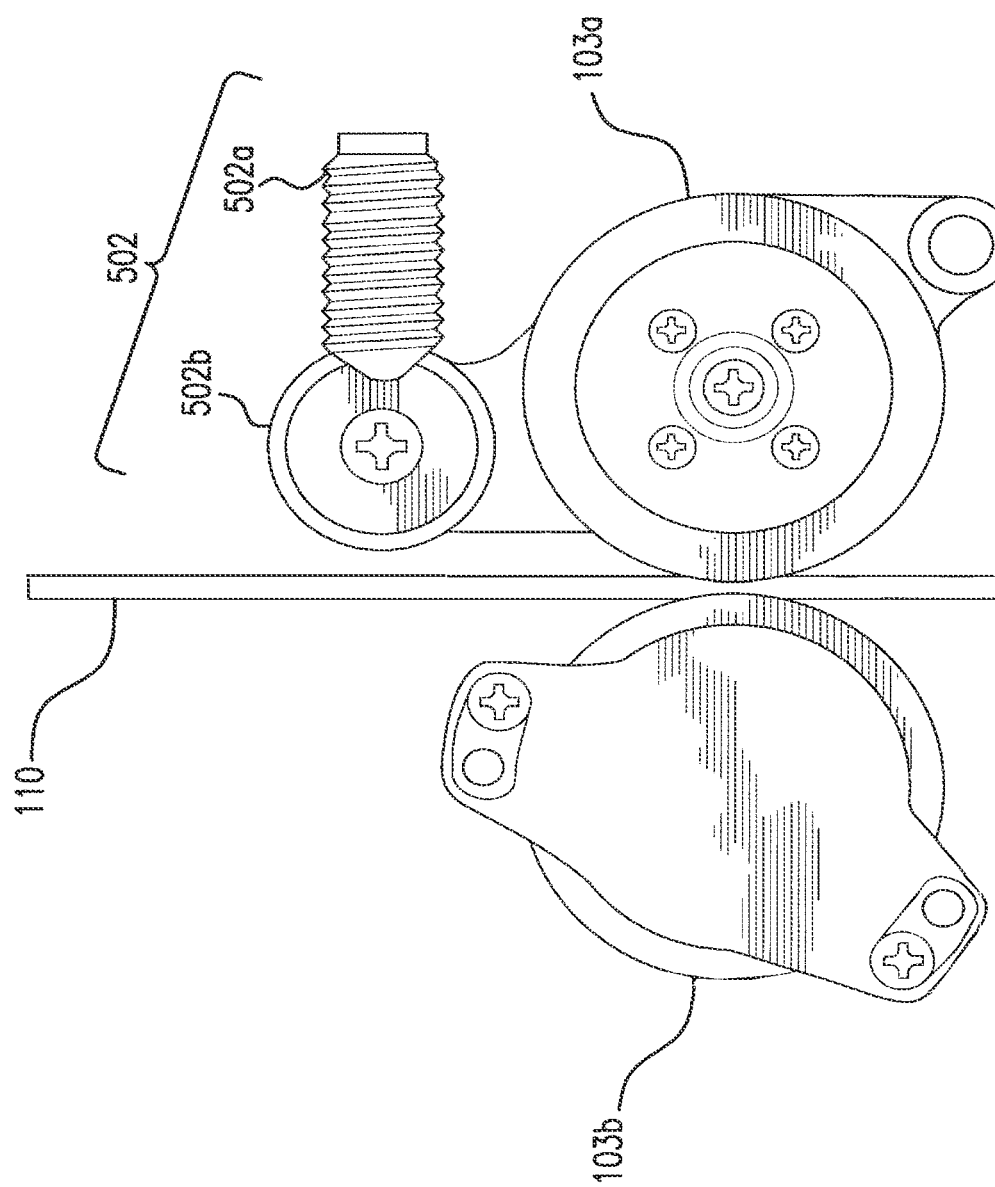
FIG. 5A illustrates aspects of an additive manufacturing print head.
Figure 5B:
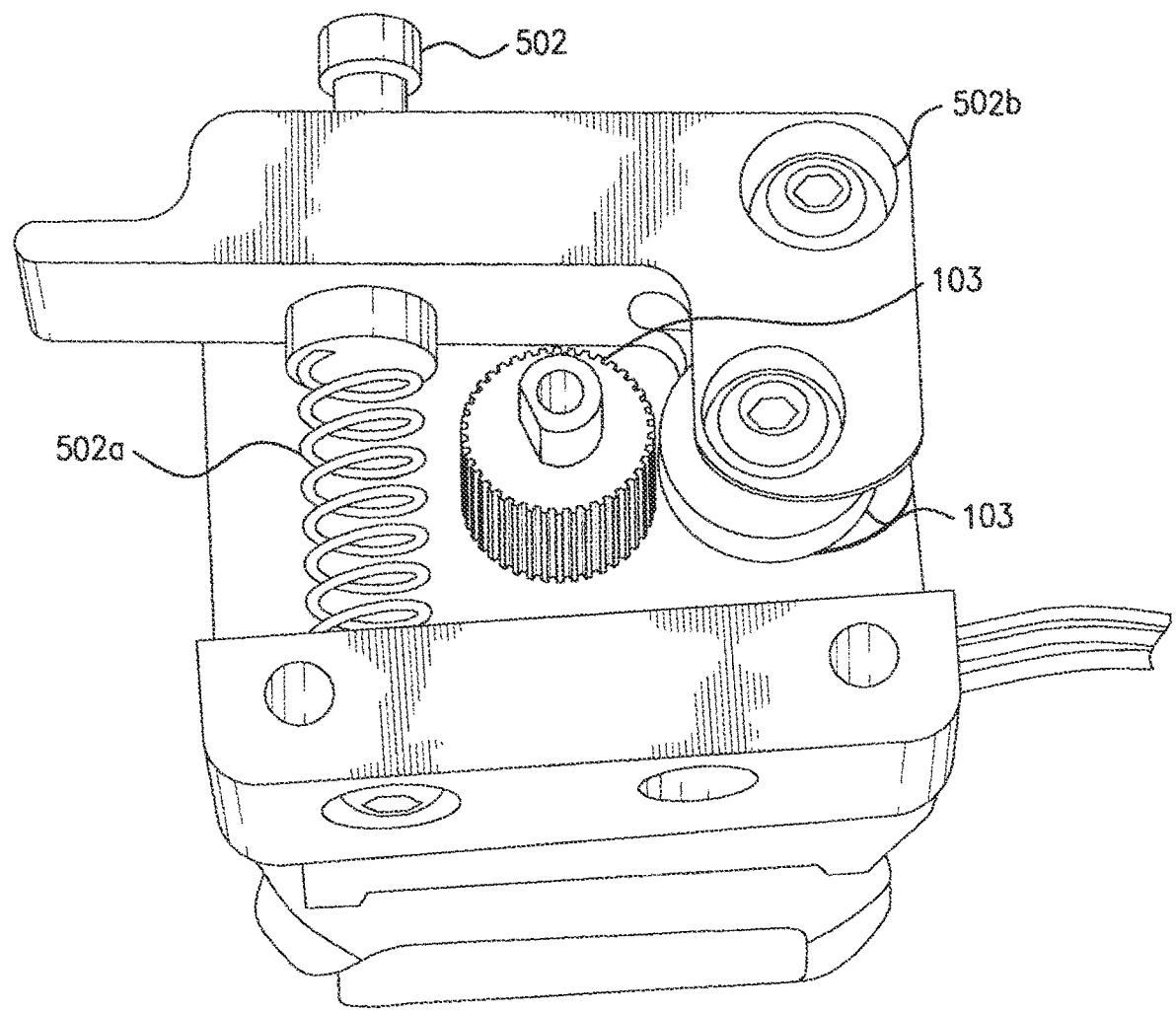
FIG. 5B illustrates aspects of an additive manufacturing print head.

FIGS. 5A and 5B illustrate exemplary assemblies for application of force to hobs 103. Of note and as referenced above, only one "drive hob" may be driven by motor 602 in certain of the embodiments, and the opposing hob may be passive, or both hobs may be driven. In either case, the undriven hob, or either or both of the driven hobs in such embodiments, may include, in association therewith, one or more force adjustments 502 to adjust the force applied by the hobs to the printed material filament 110.

The hob 103a subjected to the force adjustment 502 may be spring loaded, cammed, or otherwise pressed against 502b the driven hob upon the force adjustment 502a to both provide grip of the filament between the hobs 103 and/or to provide a relative adjustability to allow for differing filament sizes. For example, force adjustment 502 may include movement toward or away via the cam or the like 502b, such as by a rotational adjustment to a threaded adjustable force element 502 as shown in FIG. 5A, by way of non-limiting example, to thereby urge the hob 103a associated with the force adjustment 502 closer to or further from the other hob 103, dependent upon the direction of the force adjustment 502, which necessarily modifies the force applied by hobs 103 to the printed material filament 110.

A typical spring loaded force mechanism 502 used to press an undriven hob 103a against a driven hob 103b with the proper force is illustrated in FIG. 5B (A). Of note and as is evident in FIG. 5B, it is generally the case that this spring loaded mechanism 502 is manually adjustable to modify the applied force to the desired level.

The manual adjustment of the spring loading 502 addresses a number of process variables in the printing process, particularly those dependent upon differences in print material filament size and makeup. By way of example, print materials may vary from a soft TPU to PLA, to ABS, to glass filled or high temperature filaments, and each of these requires a different optimized compression load on the print feed hobs 103. Of course, filaments may also vary as to diameter, which also requires manual adjustment of the afore-discussed spring loader 502.

Figure 6:
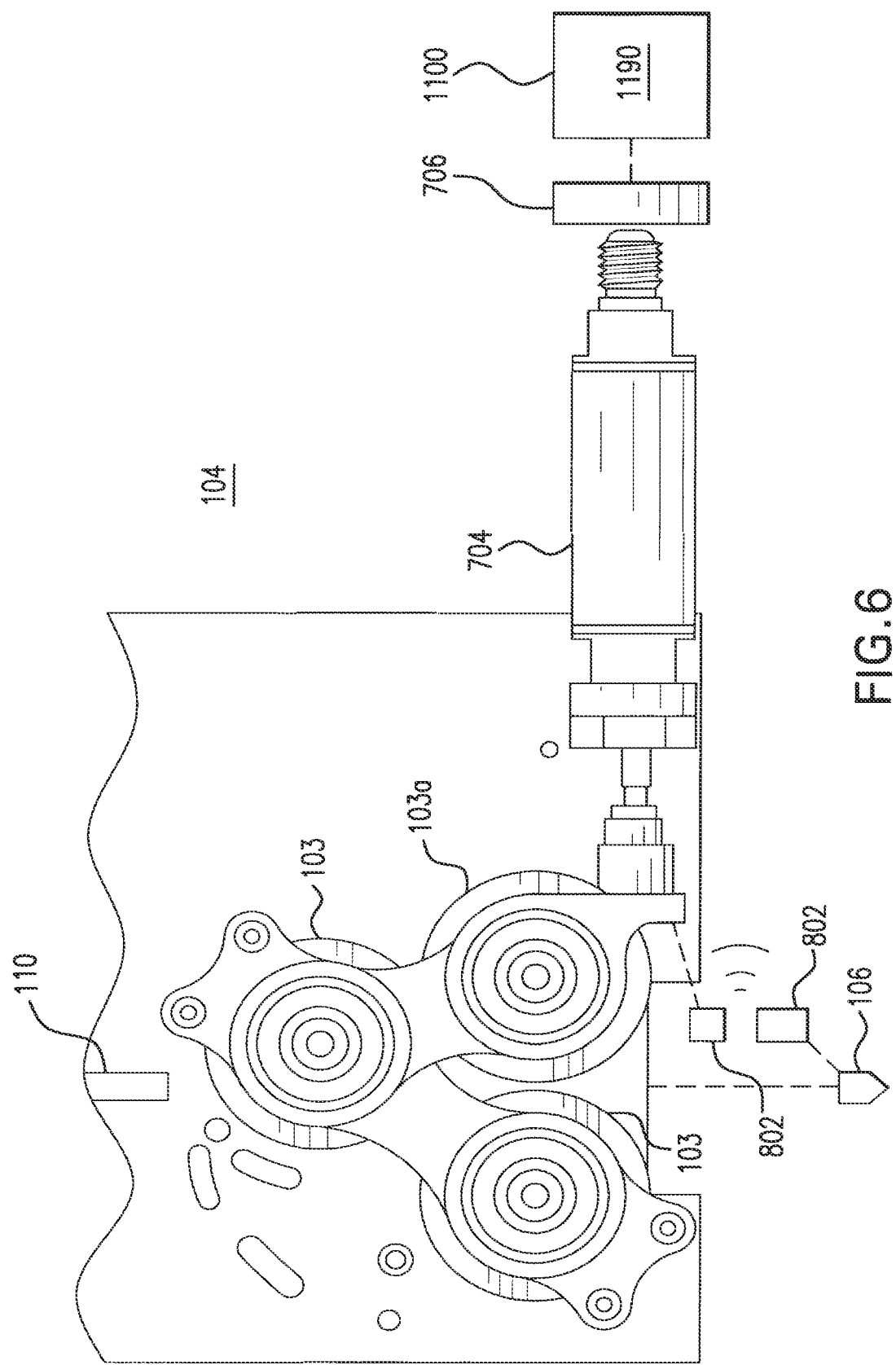
FIG. 6 illustrates aspects of an additive manufacturing print head.

FIG. 6 illustrates an extruding print head 104 comprised of two hobs 103. Of note, one or both of the hobs illustrated may be driven, such as by a motor, as discussed herein throughout. Yet further, either or both hobs may have, in association therewith, precision encoding, as referenced above.

At least one of the hobs 103a may be subjected to an automated dynamic force adjustment 704, such as may be provided by an air spring, rather than by the manual, non-dynamic compression spring 502 illustrated in FIGS. 5A and 5B. The dynamic spring force 704 is then communicatively associated, such as by wire or wireless, with one or more controllers 1100 that control the force applied by the dynamic spring force 704, such as using one or more spring regulators as discussed below, and responsive to one or more control algorithms 1190.

As used herein, an "air spring" is discussed solely by way of example. That is, the dynamic spring force 704 may comprise any electronically controllable lower friction spring and/or spring cylinder, i.e., the embodiments may encompass any dynamic spring force 704 driven in any manner that enables real time precision control of the hob force by the controller 1100. By way of non-limiting example, the dynamic force mechanism 704 may comprise a very low friction airpot cylinder, or a piston/cylinder. By way of additional example, a motor 706 may automatically drive a mechanical screw 704, akin to that discussed above with respect to FIGS. 5, responsive to controller 1100 to dynamically compress or de-compress a mechanical spring associated with the mechanical screw 704 to thereby provide the dynamic spring force.

It will be appreciated by the skilled artisan that an additive manufacturing system may have a number of parameters that vary depending on the feed print material. In addition to the aforementioned material type and filament diameter, these parameters may include nozzle temperature, base platform temperature, filament feed rates, and so on. As such, the parameters may not only vary with the particulars of the feed material 110, but also in accordance with the print plan and/or other equipment, and the embodiments are suitable to automatically and repeatably adjust the air spring pressure in accordance with the need to modify any such factors pursuant to algorithm 1190.

By way of non-limiting example, a TPU filament may work best under low hob force, while a filament with a high glass content may require higher hob force. Further, a print plan requiring high speed filament feeding may require, either in constant or only at discrete times, a higher hob force. Additionally, the hob encoder 604 referenced above may dictate variations in the hob force for any of the variety of circumstances discussed herein or otherwise known to the skilled artisan, such as correspondent to variations in the thickness of the filament.

Additionally, feedback or anticipation may be used by the controller 1100 to vary the hob force delivered by dynamic force adjustment 704. That is, sensing, such as by sensors 802, of the print activity may cause dynamic variation in hob force, or advanced knowledge by controller 1100 of upcoming print actions in the print plan (such as may form portion of algorithm 1190) may be used to select variations in the hob force. By way of example, hob force may vary based on a look-ahead at the print action upcoming, and an algorithmic anticipation by control algorithm 1190 on the consequent requirements on the extruder. In one such exemplary circumstance, the hob force may be increased when high accelerations or decelerations are upcoming. As such, the required hob force may be increased only just before when it is needed, rather than the higher hob force being unnecessarily applied for the duration of the print, to the possible detriment of the printing process.

As referenced, feedback, such as sensor-based feedback 802, may also be employed by the controller in selecting hob force. For example, motor current or torque feedback may be assessed, such as by sensing 802, in real time and used to control the hob force—that is, if the load on the motor increases, so too does the hob force; if the load on the motor decreases, so too does the hob force. Similarly, force feedback at the nozzle 106 may be used by the controller to select the hob force required for optimized feeding of the filament 110.

Other system sensing 802 may also provide direct or indirect feedback for the selected hob force. By way of non-limiting example, nozzle temperature may be sensed and used in selecting hob force—that is, if the nozzle temperature falls, more hob force is required to drive the filament 110.

Additionally, the embodiments may provide pre-print and/or curative action that may or may not be related to the printing and the print plan. By way of example, the hob force may be dynamically controlled, such as by pulsing, in the embodiments, such as wherein high force is pulsed on a hob to improve the grip on the filament, such as upon slippage or at initial material feed. In such a case, once the grip is sufficiently improved, the controller may lower the hob force for the steady state print plan running. The high force pulsing may also enable a deeper penetration of the hob teeth into the filament.

It goes without saying that the constant or pulsed automated hob force discussed throughout may also constitute a decreased force or decreased force pulse, i.e., a retraction of the hob 103, and the automated dynamic force mechanism 704 may be applied to a driven hob, an undriven hob, or both hobs. By way of non-limiting example, the driven hob may be automatically retracted, such as to provide clearance for loading or unloading of the filament. It will be appreciated that the foregoing may enable automated loading and unloading of the filament.

The controller 1100 may be, for example, pre-programmable, or may be modified manually. That is, the controller 1100 may store, such as in one or more computing memories as discussed below, a preprogrammed relationship between the filament 110 used, such as by filament type and/or diameter, and the force to consequently be applied by the dynamic force mechanism 704 to the hob(s) 103; and/or the user may enter to the controller 1100 a corresponding force to be applied in a given circumstance, to thereby control the dynamic force mechanism 704.

As detailed above, the controller 1100 controls the hob force applied based on any of the exemplary print run factors discussed. By way of non-limiting example, the controller 1100 may comprise a programmable "smart" regulator that is suitable, once programmed, to quickly change the pressure in an air cylinder of the dynamic force 704 in certain circumstances, which correspondingly changes the force applied to the hob(s) in real time. Additionally and alternatively, the regulator may be subjected to external controls, such as via wired or wireless communication with one or more remote processors, running one or more control algorithms 1190, acting as the controller 1100. In each such case, the controller 1100 optimizes the hob force applied to thereby control the loading on the extruder hardware and motor, and on the filament.

Figure 7:
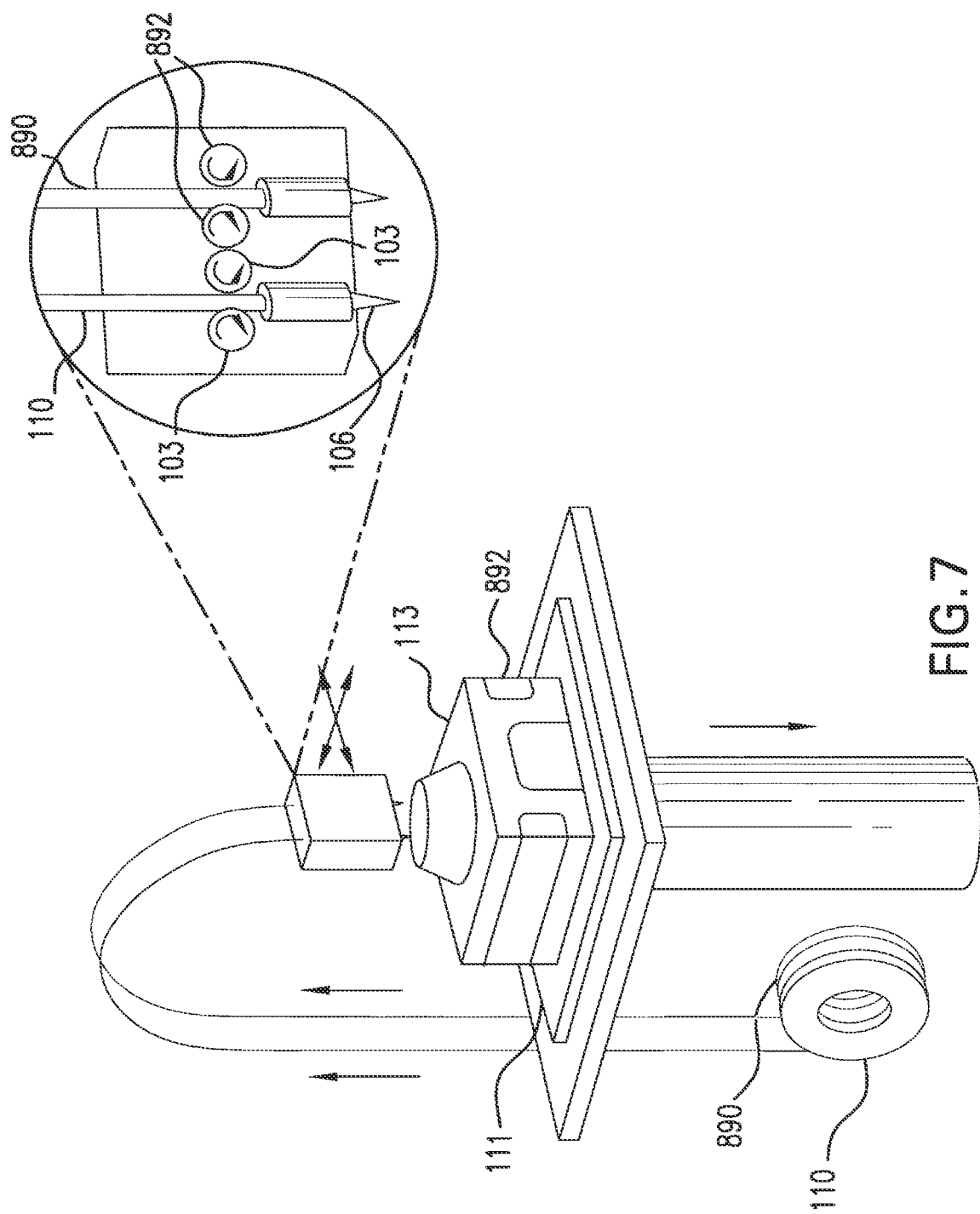
FIG. 7 illustrates an exemplary additive manufacturing system.

It will be appreciated by the skilled artisan, in light of the discussion herein, that the embodiments may be employed to apply dynamic force to extruders at any point in an additive manufacturing system. For example, some additive manufacturing systems may have multiple extruders, such as one at the print head, as detailed in the examples provided herein, and one at the material supply point. Alternatively, a supporting material 890 may be fed via a different set of hobs 892 than the hobs 103 for the print build material filament 110, as shown in FIG. 7.

Further, in addition to the dynamic force adjust, the embodiments automate, using control 1100, to make repeatable the setting of the force between prints. For example, when the print material switches from a soft TPU, to PLA, to ABS, and to a high temp PEEK with a glass filler, the force on the hobs must change to feed correctly. However, rather than employing a manual tool, the embodiments programmatically and repeatably set the hobs force.

Figure 8:
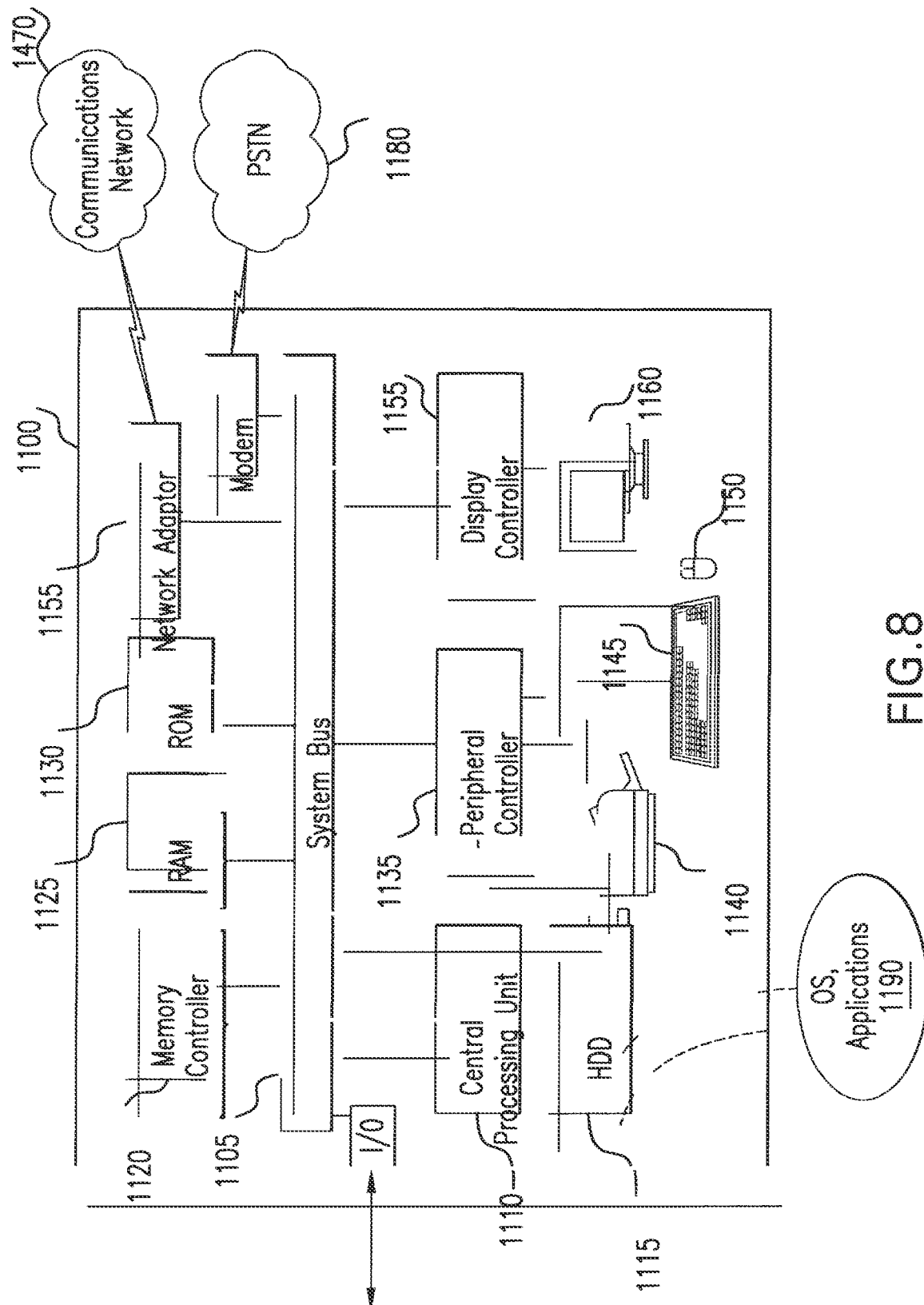
FIG. 8 illustrates an exemplary computing system.

FIG. 8 depicts an exemplary computing system 1100 for use in association with the herein described systems and methods. Computing system 1100 is capable of executing software, such as an operating system (OS) and/or one or more computing applications 1190, such as applications including and applying the algorithms 1190 discussed throughout, and may execute such applications, such as to control one or more hob motors 602 and hob force mechanisms 704, by sending data from, and by using data, such as sensor data, received at, the I/O port.

The algorithms 1190 may include: a comparison of current sensor readings to stored readings, wherein the stored readings, alone or in combination with other parameters, have corresponded thereto one or more hub force adjustments for execution by the dynamic force adjustment 704; and/or a relational database of filament parameters to hob force adjustments, by way of non-limiting example. The algorithms 1190 may additionally comprise one or more rule sets or rules engines, for example.

The operation of exemplary computing system 1100 is controlled primarily by computer readable instructions, such as instructions stored in a computer readable storage medium, such as hard disk drive (HDD) 1115, optical disk (not shown) such as a CD or DVD, solid state drive (not shown) such as a USB "thumb drive," or the like. Such instructions may be executed within central processing unit (CPU) 1110 to cause computing system 1100 to perform the operations discussed throughout. In many known computer servers, workstations, personal computers, and the like, CPU 1110 is implemented in an integrated circuit called a processor.

It is appreciated that, although exemplary computing system 1100 is shown to comprise a single CPU 1110, such description is merely illustrative, as computing system 1100 may comprise a plurality of CPUs 1110. Additionally, computing system 1100 may exploit the resources of remote CPUs (not shown), for example, through communications network 1170 or some other data communications means.

In operation, CPU 1110 fetches, decodes, and executes instructions from a computer readable storage medium, such as HDD 1115. Such instructions may be included in software such as an operating system (OS), executable programs, and the like. Information, such as computer instructions and other computer readable data, is transferred between components of computing system 1100 via the system's main data-transfer path. The main data-transfer path may use a system bus architecture 1105, although other computer architectures (not shown) can be used, such as architectures using serializers and deserializers and crossbar switches to communicate data between devices over serial communication paths. System bus 1105 may include data lines for sending data, address lines for sending addresses, and control lines for sending interrupts and for operating the system bus. Some busses provide bus arbitration that regulates access to the bus by extension cards, controllers, and CPU 1110.

Memory devices coupled to system bus 1105 may include random access memory (RAM) 1125 and/or read only memory (ROM) 1130. Such memories include circuitry that allows information to be stored and retrieved. ROMs 1130 generally contain stored data that cannot be modified. Data stored in RAM 1125 can be read or changed by CPU 1110 or other hardware devices. Access to RAM 1125 and/or ROM 1130 may be controlled by memory controller 1120. Memory controller 1120 may provide an address translation function that translates virtual addresses into physical addresses as instructions are executed. Memory controller 1120 may also provide a memory protection function that isolates processes within the system and isolates system processes from user processes. Thus, a program running in user mode may normally access only memory mapped by its own process virtual address space; in such instances, the program cannot access memory within another process' virtual address space unless memory sharing between the processes has been set up.

In addition, computing system 1100 may contain peripheral communications bus 135, which is responsible for communicating instructions from CPU 1110 to, and/or receiving data from, peripherals, such as peripherals 1140, 1145, and 1150, which may include printers, keyboards, and/or the sensors, encoders, and the like discussed herein throughout. An example of a peripheral bus is the Peripheral Component Interconnect (PCI) bus.

Display 1160, which is controlled by display controller 1155, may be used to display visual output and/or presentation generated by or at the request of computing system 1100, responsive to operation of the aforementioned computing program. Such visual output may include text, graphics, animated graphics, and/or video, for example. Display 1160 may be implemented with a CRT-based video display, an LCD or LED-based display, a gas plasma-based flat-panel display, a touch-panel display, or the like. Display controller 1155 includes electronic components required to generate a video signal that is sent to display 1160.

Further, computing system 1100 may contain network adapter 1165 which may be used to couple computing system 1100 to external communication network 1170, which may include or provide access to the Internet, an intranet, an extranet, or the like. Communications network 1170 may provide user access for computing system 1100 with means of communicating and transferring software and information electronically. Additionally, communications network 1170 may provide for distributed processing, which involves several computers and the sharing of workloads or cooperative efforts in performing a task. It is appreciated that the network connections shown are exemplary and other means of establishing communications links between computing system 1100 and remote users may be used.

Network adaptor 1165 may communicate to and from network 1170 using any available wired or wireless technologies. Such technologies may include, by way of non-limiting example, cellular, Wi-Fi, Bluetooth, infrared, or the like.

It is appreciated that exemplary computing system 1100 is merely illustrative of a computing environment in which the herein described systems and methods may operate, and does not limit the implementation of the herein described systems and methods in computing environments having differing components and configurations. That is to say, the concepts described herein may be implemented in various computing environments using various components and configurations.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A method of additive manufacturing, comprising:
   rotating, via at least one motor, at least one of two proximate hobs to receive and push therebetween a print material filament to be extruded from a print nozzle tip for the additive manufacturing;
   adjusting a force adjustment on one of the two hobs to urge the force-receiving hob toward the other of the two hobs;
   pulsing the force adjustment so as to remedy one of a clog or a slippage of the print material during the push.

2. The method of claim 1, wherein the pulsing is responsive to an instruction from a controller that has sensed the clog or the slippage.

3. The method of claim 2, wherein the sensing is performed by an encoder on a motor that provides the rotating.

4. The method of claim 3, wherein the encoder comprises a magnetic encoder.

5. The method of claim 1, wherein the two proximate hobs comprise a diameter in the range of 8 mm to 40 mm.

6. The method of claim 1, wherein the force adjustment is cammed.

7. The method of claim 1, wherein the force adjustment is a spring.

8. The method of claim 7, wherein the spring comprises an air spring.

* * * * *